by the emulsifying agent hereinafter more particularly described to form the spray solution which is a dispersion of the concentrate in water in dilutions which may vary according to the particular type of spray from proportions ranging from one part of the base to fifty parts of water to from one part of base to as high as a thousand parts of water with various intermediate ranges as may be desired but preferably from one to two hundred to one to eight hundred.

When the spray is applied to the insect, and incidentally the foliage, the volatile component assists in the rapid spread of the minute particles deposited when the emulsion breaks. This rapid spread causes a uniform coating and permits penetration into the various recesses in the coating of insects. It likewise permits a ready "wetting" of the waxy surface of the insect. Since the toxicant is usually more soluble in the volatile component, it will be selectively partitioned therein and the smaller more active molecules rapidly carry the toxicant to both surfaces of the film of oil. On the surface in contact with the insect the volatile liquid carries the toxicant to all portions of the insect where it can act efficiently and effectively. Some insects have waxy woolly threads covering their bodies that are repellent to many sprays. Here the addition of the more fluid, volatile component permits penetration through this protective coating to vital organs of the insect.

The selection of the volatile component is one requiring considerable care since this must satisfy a number of conditions as herein set forth. Nevertheless, there are a large number of compounds which may be employed. It may be a single compound or a mixture but is referred to in the singular. Many liquids have been successfully used which if applied directly to the foliage or as the principal constituent of a dispersion would cause severe burn or would evaporate too rapidly but in the combination as set forth it is possible to employ these liquids, which may in themselves be insecticides to a certain extent, without damaging the foliage. As described in my application Serial No. 740,197, filed August 16, 1934, and issued as Patent No. 2,127,526, dated August 23, 1938, a suitable volatile liquid is a petroleum fraction of a very narrow distillation range produced by repeated fractional distillation. In addition thereto I have found that other highly volatile petroleum fractions as well as a number of other liquids may be employed. These liquids fall into a number of chemical classes which include, liquid aliphatic compounds, aromatic compounds, terpenes, chlorinated aliphatic and aromatic compounds, esters, organic oxides or ketones, higher alcohols, etc. Among the specific organic compounds that have been successfully employed are the more volatile components of petroleum hydrocarbons, benzene, turpentine, carbon tetrachloride, chloroethylene, monochloroethylene, trichloroethylene, chlorobenzene, trichlorobenzene, amylacetate, dibutyl phthalate, ethyl benzoate, mesityl oxide, pine oil, carbon disulphide and others. These and related compounds that act in a similar manner are included in the term volatile liquid, volatile ingredient or other equivalent expression.

The addition of these volatile ingredients to the composition described in my copending application Serial No. 728,407, United States Patent No. 2,104,757, which is directed more particularly to a three-component mixture has increased the toxicity of the insecticides and what is more important has produced more uniform kill with varying dilutions. In most instances a one to eight hundred dilution gives very nearly as good results as a one to six hundred dilution while with the three component mixture the higher dilution was less effective.

The insecticide concentrate includes, as its fourth component, an oil soluble emulsifying agent which is preferably substantially anhydrous. Where a very effective emulsifying agent such as Emulphur A, manufactured under United States Patent No. 1,970,578 to Schoeller et al. and sold by the General Dyestuff Company, is incorporated only about three to five percent is necessary. It is extremely important to include an oil soluble emulsifying agent in the concentrate. In the first place it assists in uniformly dispersing certain types of extract contact insecticides in the concentrate which might otherwise agglomerate or coagulate and eventually precipitate so that thereafter a uniform application to the insect infested areas would be impossible. The presence of the emulsifying agent in the concentrate also makes possible the preparation of a proper type of aqueous spray.

Some medium is necessary to distribute insecticides in small but effective amounts uniformly over the infested areas of plants, trees or other foliage. The cheapest and most convenient distributing agent, with no ill effects on the host, is water. However many toxicants and all oils are water insoluble making solution in water impossible. Distribution in water can be obtained by dispersion or emulsification through the addition of a suitable agent in proper amounts. Since the water serves no useful purpose in an insecticide except to distribute it, means should be provided to remove the water from the applied insecticide. This can be accomplished by controlling the character of the spray dispersion produced which depends on the nature and amount of emulsifying agent employed as well as on the method of preparing the dispersion.

In using my insecticide concentrate it is preferable to have a relatively unstable dispersion, that is, one which will break after application to the insects and foliage. The water will not "wet" the insect and if it drips off before the emulsion or dispersion breaks it may carry away the active ingredients. By using Emulphur A in the proportions indicated as a component of the concentrate there is provided a concentrate that readily disperses in water yet breaks to deposit the toxicant at the proper time. When a water soluble emulsifying agent is mixed with water and the other ingredients added to this water emulsion a properly performing dispersion cannot be obtained and results, in terms of effectiveness and persistence, are far inferior. This may be due to the water's forming an intermediate protective film between the insect and the toxicant carrying oil and also excessive dripping or washing away of the active constituents.

While Emulphur A has been found successful with glyceride oils other oil soluble emulsifying agents have been employed but generally in greater relative amounts as for example; sulfonated olive oil 10 to 15%, sodium naphthenate 10 to 15%, diglycol laurate 20 to 40%, "Turkelene" 50%, sulfonated fish liver oil 10 to 20%, "Albasol" 10 to 20% or sulfonated castor oil 10 to 20%.

In my copending application Serial No. 728,407, United States Patent No. 2,104,757, there are given the results of tests using each of the components, oil, toxicant, and emulsifying agent individually and as a combination. Tests have likewise been made comparing the effectiveness of the four component concentrate with the three component concentrate.

In each of the following tests the amount of toxicant was uniform with respect to the percentage in the concentrate, which was the extract from three pounds of 1% pyrethrum flowers per gallon or 1.54 grams of pyrethrum extract analysing about 25% pyrethrins per 100 c. c.

One part of a concentrate consisting of 96% corn oil, 4% Emulphur A, dispersed in 600 parts of water when sprayed on a nasturtium host infested with *Aphis rumicis Linne* gave an average kill of 90.8% and when diluted to 800 parts of water produced a 77.7% kill.

Under the same conditions and at the same time a spray of 71% corn oil, 25% turpentine and 4% Emulphur A concentrate in 600 parts of water gave an average kill of 98.6% while diluted to one part in 800 obtained an 83% kill.

Other tests with various solvents in place of the turpentine have given similar improved results. In actual service in apple orchard control the four component concentrate produced the four best out of eight plots where the other four were sprayed with the best commercial sprays available. The crops harvested were larger, there was a greater number of United States #1 grade and the general condition of these plots was much better than the adjacent plots.

It will thus be seen that this invention provides a new and useful insecticide of greater effectiveness in killing insects, without plant damage, and enhances the yield of marketable product.

Another advantage of the insecticide described herein is its compatability for other types of insecticides. The greater part of the cost of spraying comes from the time and wages of the workers, the materials used being rather inexpensive in comparison. It has accordingly been recommended by entomologists that wherever it is possible to make two or three applications at once by using combined sprays such practice should be followed. In practice great difficulty has been experienced in following such recommendations since great precautions must be taken in mixing conventional sprays because in some instances the materials of two or more sprays, when combined, will undergo changes, producing substances injurious to the plant or affecting the value of the spray for the purpose for which it was intended.

The instant insecticide is for the most part not subject to this disability since many stomach poisons or fungicides can be added for unitary application with the contact insecticide. In many cases such additions are not necessary but when desirable can be readily accommodated in a single spray. The bland oil, solvent and emulsifying agent then performs the additional function of spreaders and stickers. For example, fungicides such as copper zeolite or sulfur can be incorporated in the concentrate. Other materials having fungicidal properties may likewise form a part of the spray as applied to the trees and plants. Stomach poisons, i. e., arsenic compounds, fluorine compounds and the like may be used in a similar manner. It should be noted, however, that while such additions can be made for specific conditions they are usually unnecessary since for most purposes the concentrate is complete in itself.

Having thus described my invention with examples of certain preferred embodiments thereof what I claim is:

1. An insecticidal concentrate comprising a fixed oil, a contact insecticide, a volatile liquid in which the contact insecticide is soluble and which is itself soluble in the oil and an emulsifying agent soluble in the concentrate.

2. An insecticidal concentrate comprising a glyceride oil, a contact insecticide, a volatile liquid in which the contact insecticide is soluble and which is itself soluble in the oil and an emulsifying agent soluble in the concentrate.

3. An insecticidal concentrate comprising a glyceride oil, the toxic values of pyrethrum, a volatile liquid in which the contact insecticide is soluble and which is itself soluble in the oil and an emulsfying agent soluble in the concentrate.

4. An insecticidal concentrate comprising a glyceride oil, the toxic values of pyrethrum, a volatile petroleum hydrocarbon and "Emulphur A."

5. An insecticidal concentrate comprising a glyceride oil, nicotine alkaloid, a volatile liquid in which the contact insecticide is soluble and which is itself soluble in the oil and an emulsifying agent soluble in the concentrate.

6. An insecticidal concentrate comprising a glyceride oil, a contact insecticide, a volatile petroleum hydrocarbon and an emulsifying agent soluble in the concentrate.

7. An insecticidal concentrate comprising a glyceride oil, a contact insecticide, turpentine and an emulsifying agent soluble in the concentrate.

8. An insecticidal concentrate comprising a glyceride oil, a contact insecticide, a volatile chlorinated hydrocarbon and an emulsifying agent soluble in the concentrate.

9. An insecticidal spray comprising one part of an insecticidal concentrate comprising a fixed oil, a contact insecticide, a volatile liquid in which the contact insecticide is soluble and which is itself soluble in the oil and emulsifying agent soluble in the concentrate dispersed in from about 50 to about 1000 parts of water.

10. An insecticidal spray comprising one part of an insecticidal concentrate comprising a glyceride oil, a contact insecticide, a volatile liquid in which the contact insecticide is soluble and which is itself soluble in the oil and an emulsifying agent soluble in the concentrate dispersed in from about 50 to about 1000 parts of water.

11. An insecticidal spray comprising one part of an insecticidal concentrate comprising a glyceride oil, a contact insecticide, a volatile petroleum hydrocarbon and an emulsifying agent soluble in the concentrate dispersed in from about 50 to about 1000 parts of water.

12. An insecticidal concentrate comprising from about 45% to 85% of a fixed oil, a contact insecticide, from about 10% to 50% of a volatile liquid in which the contact insecticide is soluble and which is itself soluble in the oil and an emulsifying agent soluble in the concentrate.

WALTER C. O'KANE.

Patented Sept. 12, 1939

2,172,689

UNITED STATES PATENT OFFICE 2,172,689

INSECTICIDE

Walter C. O'Kane, Durham, N. H., assignor to Spray Base Corporation, Jersey City, N. J., a corporation of New Jersey No Drawing. Application November 24, 1936, Serial No. 112,463

12 Claims. (Cl. 167—43)

This invention is directed to a novel composition useful for the economic control of insect pests.

In its broadest aspect the invention seeks to provide a combination of several ingredients which cooperate to produce an insecticide that is particularly efficacious in controlling the insects which are harbored by trees, plants and other types of foliage and which cause considerable damage to them in their life cycle. There have been many attempts made to provide insecticides which had the essential qualifications of killing the insect at any or all stages of its development and yet which would not unfavorably affect the plant on which it lived while at the same time was in a form in which it could be readily and efficiently applied to the insect. There are available many insecticides that can be successfully used under carefully regulated conditions but which under some conditions are either ineffective or on the other hand, actually dangerous to use on plant life. Some of these insecticides although strong enough to control the insect life are so strong or have undesirable properties in that they "burn" the foliage in which case the treatment is in many instances harder on the plant than the damage that might have been caused by the insect. Certain insecticides when applied to a plant apparently have no ill effect yet over a period of years the strength of the plant is reduced and its crop of fruit or the like may gradually taper off until there is no marketable crop therefrom. This effect has been noted in the case of certain types of oils that have been applied to plants, trees and other types of foliage.

Some insecticides are effective to kill insects only in certain stages of their development so that if the spray or application of the insecticide is not properly timed to cover that portion of the life cycle of the insect the treatment made has no effect and insects continue to develop as they had previously done and would have done had the control measures not been taken.

The present invention seeks to overcome these difficulties of the prior art in providing an insecticide that can be very conveniently applied to the insect as a spray. Such a spray comprises the insecticide of the type hereinafter described emulsified or dispersed in an aqueous medium. This requires that the concentrate shall be of a type which can be readily dispersed in the aqueous medium without undue mechanical agitation, critical manipulation and the like.

It is likewise an object of this invention to provide an insecticide that is effective for all types of insects commonly found infesting trees, plants and other types of foliage. Such an insecticide must be effective on all stages of insect development that can be reached by the usual forms of application.

A further object is to provide an insecticide which can be safely applied to the foliage without causing any direct damage or have other cumulative ill effects.

To obtain these and other related objects which will be hereinafter described or apparent, I provide a concentrate for an insecticidal spray that comprises four principal components: a fixed oil, a contact insecticide, a volatile liquid in which the contact insecticide is soluble and which is itself soluble in the oil, and an emulsifying agent soluble in the concentrate.

This composition, generally, has some features in common with those of the prior art in which it has previously been suggested to spray foliage with various oils as for example, mineral oil. Insecticides or specifically contact insecticides have been frequently applied to foliage in a number of ways. It is common to dust contact insecticides on foliage but prior to my invention thereof it was not suggested to provide an insecticide concentrate comprising a contact insecticide in a fixed oil together with an oil soluble emulsifying agent. This combination forms the claimed subject matter of my copending application Serial No. 728,407 filed May 31, 1934, issued as Patent No. 2,104,757, dated January 11, 1938.

The instant invention is particularly distinguished from the claimed prior invention in that a fourth ingredient is combined with this three component concentrate. This fourth ingredient is a relatively volatile liquid that forms a solvent for the contact insecticide and is itself soluble in the oil employed. When such a volatile liquid is included in the combination, the insecticide, considered as a whole, is much more effective than is the case where the volatile ingredient is not present. The reason why this is true is not clearly apparent but it appears that the solvent ingredient, usually comprising a liquid of rather small molecules, is able to pass or migrate through the oil very rapidly and carry with it the contact insecticide that is soluble therein. In this way the contact insecticide is brought to the outer surfaces of the very thin film of oil and if one of these surfaces is in contact with an insect the more active ingredient carries the insecticide over the surface of the insect and brings the toxicant to the vulnerable areas of the insect where it acts on the insect and ultimately kills it. The bland oil itself is able to carry the toxicant to the insect to a certain extent but it is not nearly as effective as when a smaller molecule volatile solvent liquid is dissolved therein. It is also possible that the volatile liquid can more effectively "wet" the waxy surface of the insect and cover it more completely or alternatively penetrate through various portions thereof to the vital organs of the insect. At any rate, whatever the explanation may be, and the above is submitted simply as a possible theoretical explanation and not as a limitation of the invention, it is a fact that the insecticide prepared in the manner herein described is substantially more effective through the incorporation of the volatile ingredient. A large number of comparative tests have been run using the three-component concentrate and the four component concentrate herein described and the four component base was substantially more effective in its insect killing power. Also the amount of dilution did not vary the effectiveness of the insecticide as greatly as was true when the volatile ingredient was omitted.

The principal ingredient of the insecticide base comprises a bland oil of the type generally described as a fixed oil and is preferably a glyceride. This oil forms the principal ingredient both as to amounts and as to persistance on the insect or foliage. It is substantially non-volatile. When once applied it remains where it is first deposited when the emulsion breaks and there it stays in contact with the foliage or insect indefinitely. Any such material must, of course, not have any toxic effect towards the leaf. It must not, of course, smother the pores or in any manner burn the foliage. This is always important and particularly so when the new leaves are budding or when the plant is in blossom. Many oils, if applied at this time, will practically kill a tree. I have found that the glyceride oils can be safely used at practically any time in the growing or dormant season. Insects are usually more active during the growing season and therefore it is usually desirable to spray the tree or plant at that time but many types of oil sprays cannot be applied except during the dormant season.

Particular oils that have been successfully used as the principal ingredient of these insecticidal bases include corn oil, cocoanut oil, cottonseed oil, peanut oil, lard oil, fish oil, soy bean oil, castor oil and other vegetable and animal oils as well as mixtures of these.

A wide selection is permitted in the choice of the toxicant although it must have certain properties as hereinafter described. The toxicant must be of the type generally termed a contact insecticide, that is, one which acts on insects irrespective of the character of the insect's mouth parts. The way in which such insecticides act on an insect is not definitely known although the effects of such toxicants are readily apparent. Presumably it is due to action on vital organs on the surface of an insect or through penetration to vital organs within the insect or both. It is generally recommended by entomologists that if an insect can be controlled by a stomach poison such method is preferable but by means of this invention it is possible to control both sucking and biting insects with a single type of spray.

The toxicant selected should not only be a contact insecticide but must also be one that is soluble at least in the volatile component hereinafter more specifically described and preferably one which is likewise soluble in the oil. In some cases the volatile component may be used to extract a toxicant from its source. A contact insecticide which meets these requirements is pyrethrum flowers which can be extracted to give pyrethrins and possibly other toxicants. Instead of pyrethrum flowers or their extracts it is possible to use other extracts either singly or in combination although they should be soluble at least in the volatile component and should not precipitate from the concentrate. These include for example, nicotine alkaloid, the active principal of strychnia, as well as various synthetic organic compounds including amines, thiocyanates, for example, aromatic thiocyanates, aliphatic thiocyanates, and other known insecticides. It is interesting to note at this point that many of the new synthetic insecticides are likely to cause substantial plant damage unless used under very carefully controlled conditions. When these insecticides are used in the instant composition to form an insecticidal concentrate these undesirable properties are greatly minimized while the effectiveness of the toxicant is not reduced and may be increased.

In the case of extracts, particularly, it is usually necessary that contact with water be avoided and the concentrate be anhydrous. In general, water forms no part of the concentrate herein described and is added only when the spray dispersion is prepared just prior to spraying. The absence of water reduces the amount of inerts present, obviates dangers of freezing and broken emulsions from elevated temperatures, reduces transportation costs, yet the concentrate readily forms the proper type of dispersion for a spray.

The amount of toxicant used in the spray base can be varied within rather wide limits depending upon the character of the particular toxicant. In the case of pyrethrins it has been found very satisfactory to employ the equivalent of three pounds of one percent pyrethrum flowers per gallon or what might be considered as .03 pound of pyrethrins per gallon of concentrate. Other insecticides can be used in proportionate amounts depending upon the relative efficacy as compared to pyrethrum flowers.

The third and distinguishing ingredient of the present composition comprises a volatile liquid in which the contact insecticide is soluble and which is itself soluble in the oil. The volatile component is preferably employed in a quantity equal to about 25% of the total concentrate or roughly about ⅓ of the amount of the oil. These proportions may be varied within rather wide limits but the bland oil should usually comprise from 45 to 85% of the concentrate while the volatile solvent ingredient should be present in from about 10 to 50% when an effective emulsifying agent need be present in an amount of not over about 5%. Where a less effective emulsifying agent is employed the above relative proportions are employed but the bland oil and solvent will form a smaller percentage of the entire concentrate.

This volatile solvent acts in a number of ways. In the first place it dilutes the oil and reduces its viscosity resulting in greater and more rapid spread and penetrating power to produce an extremely thin film. Furthermore it assists in aiding the emulsification of the oil in the water